(12) United States Patent
Asai et al.

(10) Patent No.: US 11,092,805 B2
(45) Date of Patent: Aug. 17, 2021

(54) VEHICULAR DISPLAY DEVICE

(71) Applicant: DENSO CORPORATION, Kariya (JP)

(72) Inventors: Toshitaka Asai, Kariya (JP); Mitsuo Tamagaki, Kariya (JP); Yoshitaka Adachi, Kariya (JP); Ken Aida, Kariya (JP); Satoshi Katano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/663,254

(22) Filed: Oct. 24, 2019

(65) Prior Publication Data

US 2020/0057303 A1 Feb. 20, 2020

Related U.S. Application Data

(63) Continuation of application No. PCT/JP2018/010146, filed on Mar. 15, 2018.

(30) Foreign Application Priority Data

Apr. 27, 2017 (JP) .............................. JP2017-088746

(51) Int. Cl.
*G02B 27/01* (2006.01)
*G06F 3/147* (2006.01)
*H04N 5/232* (2006.01)

(52) U.S. Cl.
CPC ......... *G02B 27/0101* (2013.01); *G06F 3/147* (2013.01); *H04N 5/23293* (2013.01)

(58) Field of Classification Search
None
See application file for complete search history.

(56) References Cited

U.S. PATENT DOCUMENTS

| | | | | |
|---|---|---|---|---|
| 6,559,773 B1* | 5/2003 | Berry | ..................... | B60K 35/00 340/815.4 |
| 8,726,155 B2* | 5/2014 | Fang | .................... | H04N 21/242 715/716 |
| 8,884,749 B1* | 11/2014 | Palmer | ................... | B60Q 5/005 340/438 |
| 9,452,678 B1* | 9/2016 | Boss | ...................... | B60K 35/00 |
| 2005/0012599 A1* | 1/2005 | DeMatteo | .............. | B60K 37/06 340/425.5 |

(Continued)

FOREIGN PATENT DOCUMENTS

JP 2016117427 A 6/2016

*Primary Examiner* — Curtis J King
(74) *Attorney, Agent, or Firm* — Harness, Dickey & Pierce, P.L.C.

(57) ABSTRACT

A vehicular display device is used in a vehicle and displays an image received from a drawing device. The vehicular display device includes an image display unit, a notification unit, an image notification determination unit, a drawing request unit, a correspondence identification unit, and a notification execution unit. The image display unit executes notification by displaying the image. The notification unit executes notification by at least one of audio and light. The image notification determination unit determines whether the vehicle is in an image notification state. The drawing request unit requests the drawing device to draw the image corresponding to the image notification state. The correspondence identification unit identifies the correspondence notification action. The notification execution unit causes the notification unit to execute the correspondence notification action.

8 Claims, 5 Drawing Sheets

(56) References Cited

U.S. PATENT DOCUMENTS

| | | | |
|---|---|---|---|
| 2007/0078598 A1* | 4/2007 | Watanabe | G09B 29/102 701/429 |
| 2007/0103855 A1* | 5/2007 | Hara | G06F 1/1601 361/679.26 |
| 2008/0211652 A1* | 9/2008 | Cope | B60K 35/00 340/461 |
| 2009/0040034 A1* | 2/2009 | Drew | B60K 37/06 340/441 |
| 2009/0043446 A1* | 2/2009 | Drew | B60K 37/06 340/438 |
| 2009/0184812 A1* | 7/2009 | Drew | B60K 35/00 340/438 |
| 2010/0169821 A1* | 7/2010 | Masui | B60K 35/00 715/778 |
| 2011/0208389 A1* | 8/2011 | Tarte | B60K 35/00 701/36 |
| 2011/0209079 A1* | 8/2011 | Tarte | B60K 35/00 715/769 |
| 2011/0246934 A1* | 10/2011 | Nakagawa | B60K 37/06 715/802 |
| 2011/0285525 A1* | 11/2011 | Ishibashi | G09F 21/04 340/461 |
| 2011/0316879 A1* | 12/2011 | Chikahisa | G06F 3/14 345/629 |
| 2015/0328990 A1* | 11/2015 | Nakajima | G12B 11/00 362/544 |
| 2016/0023604 A1* | 1/2016 | Jenson | B60K 35/00 345/7 |
| 2016/0104437 A1* | 4/2016 | Iwakawa | B60J 3/04 345/690 |
| 2016/0189345 A1* | 6/2016 | Fujita | B60K 37/02 345/660 |
| 2016/0252955 A1* | 9/2016 | Yamamoto | G06F 3/0346 345/441 |
| 2016/0321509 A1* | 11/2016 | Okada | G06K 9/6267 |
| 2017/0169621 A1* | 6/2017 | Kawamoto | G06F 1/163 |
| 2017/0200433 A1* | 7/2017 | Yamamoto | B60K 35/00 |
| 2017/0221246 A1* | 8/2017 | Zhong | G05D 1/0038 |
| 2018/0322849 A1* | 11/2018 | Itou | G09G 5/14 |
| 2019/0097396 A1* | 3/2019 | Sakai | H01S 5/4093 |
| 2019/0265884 A1* | 8/2019 | Penilla | B60L 58/12 |
| 2019/0333481 A1* | 10/2019 | Hato | B60R 1/001 |

* cited by examiner

VEHICULAR DISPLAY DEVICE

CROSS REFERENCE TO RELATED APPLICATIONS

The present application is a continuation application of International Patent Application No. PCT/JP2018/010146 filed on Mar. 15, 2018, which designated the U.S. and claims the benefit of priority from Japanese Patent Application No. 2017-088746 filed on Apr. 27, 2017. The entire disclosures of all of the above applications are incorporated herein by reference.

TECHNICAL FIELD

The present disclosure relates to a vehicular display device used in a vehicle.

BACKGROUND

A vehicular display device including a plurality of display units has been proposed. The vehicular display device associates an image displayed at one of the plurality of display units with an image displayed at another one of the plurality of display units.

SUMMARY

The present disclosure provides a vehicular display device. The vehicular display device is used in a vehicle and displays an image received from a drawing device. The vehicular display device may execute notification by displaying the image drawn by the drawing device. The vehicular display device may execute notification by at least one of audio and light. The vehicular display device may determine whether the vehicle is in an image notification state.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
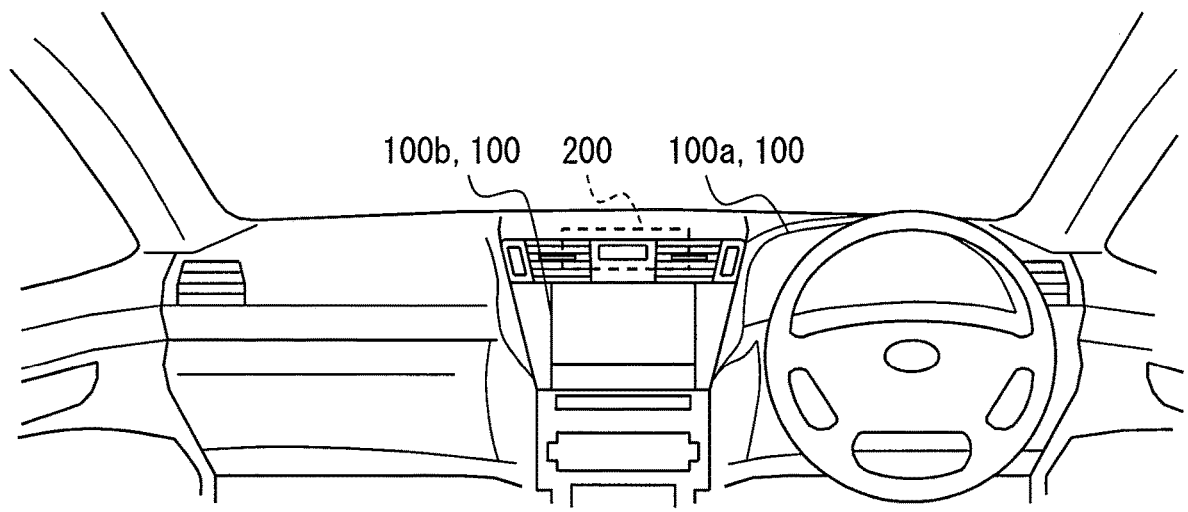
FIG. 1 is a diagram showing a vehicular display system including a vehicular display device.

For example, the inventors of the present disclosure have devised a configuration to draw an image to be displayed at a display unit by means of a drawing device provided separately from a vehicular display device. According to such a configuration, the vehicular display device requests the drawing device to draw an image, and displays the image received from the drawing device at the display unit. This configuration may thus have variation in time from a drawing request to image display due to unexpected delayed communication between the display device and the drawing device. Accordingly, image display and notification by means of light or audio may have time difference therebetween when the notification unit configured to execute notification by means of light or audio executes notification accompanied with image display.

An example embodiment of the present disclosure provides a vehicular display device that inhibits time difference between display of an image drawn by a drawing device and notification by a notification unit. The vehicular display device is used in a vehicle and displays an image received from a drawing device. The vehicular display device includes an image display unit, a notification unit, an image notification determination unit, a drawing request unit, a correspondence notification determination unit, a correspondence identification unit, and a notification execution unit. The image display unit executes notification by displaying the image drawn by the drawing device. The notification unit executes notification by at least one of audio and light. The image notification determination unit determines whether the vehicle is in an image notification state. The notification unit executes the notification accompanied with the notification by the image display unit in the image notification state. The drawing request unit requests the drawing device to draw the image corresponding to the image notification state when the image notification determination unit determines that the vehicle is in the image notification state. The correspondence notification determination unit determines a correspondence notification action corresponding to the image notification state as an action executed by the notification unit accompanied with the notification of the image notification state by the image display unit when the image notification determination unit determines that the vehicle is in the image notification state. The correspondence identification unit acquires, along with the image, image identification information identifying the image notification state indicated by the image received from the drawing device, and identifies, in accordance with the image identification information, the correspondence notification action corresponding to the image notification state indicated by the image displayed at the image display unit. The notification execution unit causes the notification unit to execute the correspondence notification action identified by the correspondence identification unit.

In the example embodiment of the present disclosure, the image display unit displays the image corresponding to the image notification state and drawn by the drawing device in accordance with the request from the drawing request unit. In this case, the correspondence identification unit acquires the image as well as correspondence identification information identifying the image notification state indicated by the image received from the drawing device. In accordance with the correspondence identification information, the correspondence identification unit can identify the correspondence notification action for the image notification state indicated by the image displayed at the image display unit.

Even in a case where there is variation in time from a drawing request by the drawing request unit to image display at the image display unit, the correspondence notification action can be executed accompanied with display of the image indicating the image notification state. In other words, this configuration can inhibit difference in time between display of the image provided by the drawing device and different notification.

With reference to the drawings, description is made below of a vehicular display system 1 including a vehicular display device 100 and a drawing device 200 according to an embodiment of the present disclosure. The drawing device 200 draws an image in accordance with a drawing request from the vehicular display device 100 and causes the vehicular display device 100 to display the image.

The vehicular display system 1 will be schematically described with reference to FIG. 1. The vehicular display device 100 is configured to present information to a user of a vehicle by means of audio, light, or combination thereof, in addition to image display.

The vehicle according to the present embodiment includes a plurality of devices such as a meter device 100a and a navigation device 100b each corresponding to the vehicular display device 100. The meter device 100a configured as the vehicular display device 100 will be described below.

The vehicular display device 100 is provided at an instrument panel and is positioned to face a driver's seat. The vehicular display device 100 is configured to notify a user seated on the driver's seat, in other words, a driver, of a state, such as vehicle speed or engine rotational speed, of the vehicle including the vehicular display device 100. The vehicular display device 100 determines use of an image, audio, or light for notification of the vehicle state. The vehicular display device 100 requests the drawing device 200 to draw an image indicating a state determined to execute notification by means of an image. The vehicular display device 100 displays the image received from the drawing device 200 and executes notifications by means of audio or light in order to notify the driver of the vehicle state.

The drawing device 200 is configured to draw an image in accordance with a request from the vehicular display device 100. The drawing device 200 transmits the drawn image to the vehicular display device. The drawing device 200 is provided to receive a drawing request from and transmit a drawn image to the vehicular display device. The drawing device 200 is provided in a dashboard or the like.

Figure 2:
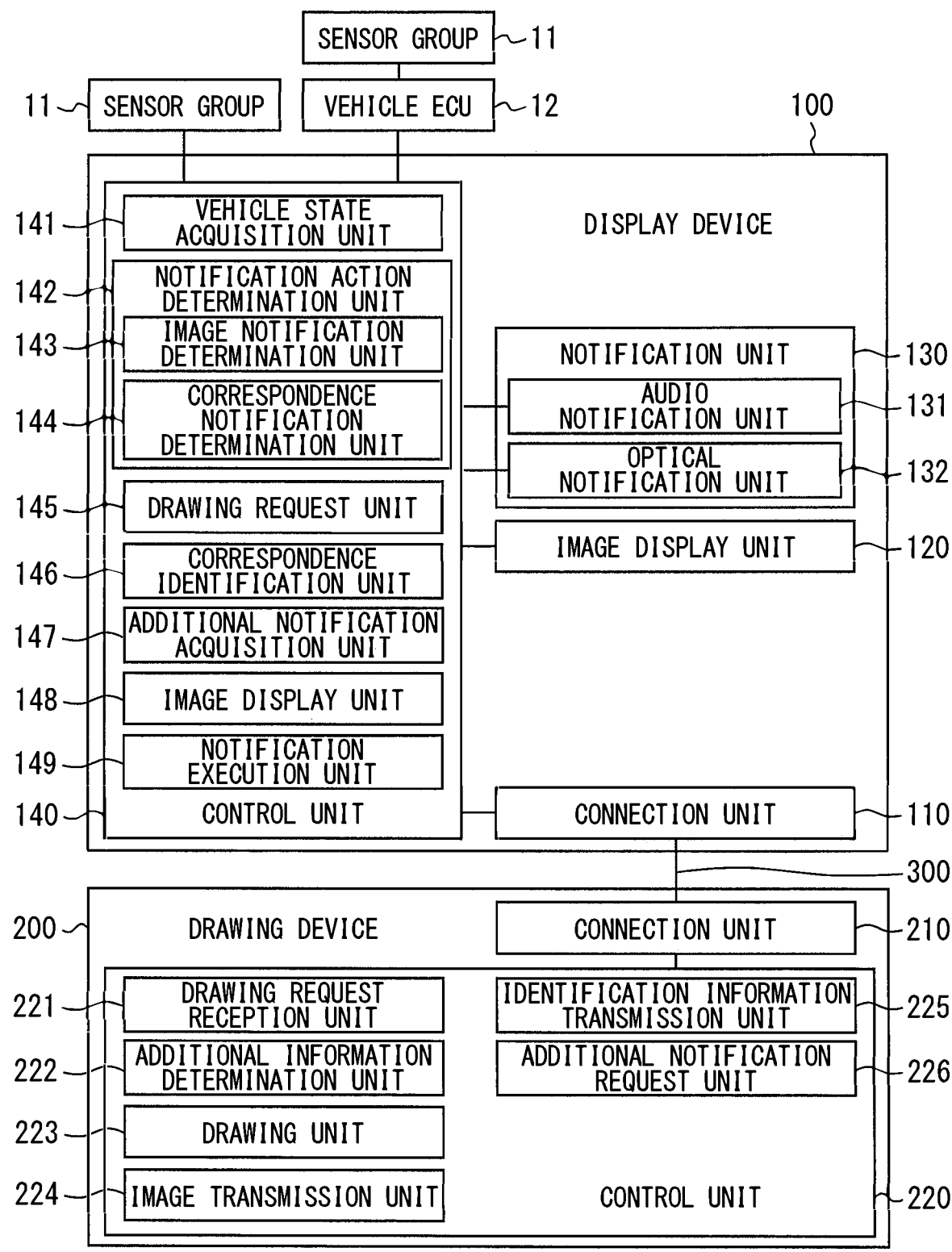
FIG. 2 is a diagram showing configurations of the vehicular display device and a drawing device.

The vehicular display device 100 and the drawing device 200 will be described in terms of configurations thereof with reference to FIG. 2. The vehicular display device 100 includes a connection unit 110, an image display unit 120, a notification unit 130, and a control unit 140. The connection unit 110 is constituted by a terminal and configured to connect a transmission cable 300. The transmission cable 300 is configured in accordance with a standard such as HDMI (registered trademark) or LVDS (Low voltage differential signaling). The connection unit 110 is electrically connected to the drawing device 200 via the transmission cable 300 and exchanges, with the drawing device 200, a drawn image and various control signals for a drawing request and the like.

The image display unit 120 is a display configured to display an image drawn by the drawing device 200. The image display unit 120 may be embodied by a TFT liquid crystal panel including a thin film transistor (TFT) or the like. The image display unit 120 is provided at the instrument panel so as to face the driver's seat. The image display unit 120 displays an image for notification to the driver.

The notification unit 130 is configured to notify the driver of a vehicle state by means of at least one of light or audio. The notification unit 130 includes an audio notification unit 131 and an optical notification unit 132. The notification unit 130 executes notification by means of light, audio, or combination thereof.

The audio notification unit 131 is configured by a buzzer, a speaker, or the like. The audio notification unit 131 is provided to deliver audio to the driver. The audio notification unit 131 may be provided close to the image display unit 120 at the instrument panel. The audio notification unit 131 outputs a warning beep, a voice, or the like to the driver to notify the driver of a vehicle state.

The optical notification unit 132 includes a plurality of light sources such as light emitting diodes. The optical notification unit 132 is provided to allow the driver to visually recognize light emitted from the light sources. The optical notification unit 132 may be provided close to the image display unit 120 at the instrument panel. The optical notification unit 132 turns ON and OFF the plurality of light sources to notify the driver of a vehicle state.

The control unit 140 is mainly configured by a computer including a CPU, a ROM, a random access memory (RAM), and the like. The CPU executes a program stored in the ROM while using a temporary storage function of the RAM. When the program is executed by the CPU, the control unit 140 exhibits preliminarily set functions. The ROM exemplifies a non-transitory tangible storage medium. The non-transitory tangible storage medium is embodied by a semiconductor storage device or a magnetic storage medium such as a magnetic disk. Part or all of the functions exhibited by the control unit 140 may be embodied as hardware by a single or a plurality of ICs or the like. For example, the audio notification unit 131 may have a function of outputting a voice embodied by a voice IC. Furthermore, a function of converting between an image and a transmission signal for transmission of the image via the transmission cable 300 may be embodied by an image signal conversion IC.

The control unit 140 exhibits functions as a vehicle state acquisition unit 141, a notification action determination unit 142, a drawing request unit 145, a correspondence identification unit 146, an additional notification acquisition unit 147, an image display unit 148, and a notification execution unit 149.

The vehicle state acquisition unit 141 acquires a vehicle state. The vehicle state includes a state of power supplied to the vehicular display device 100. The vehicle state acquisition unit 141 acquires the vehicle state by receiving a signal from a sensor group 11 depending on the vehicle state. The sensor group 11 includes various sensors and switches used in the vehicle. The sensor group 11 includes a vehicle speed sensor configured to output vehicle speed, a rotational speed sensor configured to output engine rotational speed, a seating sensor configured to output pressure or weight applied to a seat, a courtesy switch configured to output a door open/close state, an indicator switch configured to output a position of an indicator lever, and the like. The vehicular display device 100 includes an interface for connection of the various sensors. The sensor group 11 is connected to the interface to transmit signals to the vehicular display device 100 via the interface.

The vehicle state acquisition unit 141 may acquire the signals output from the sensor group 11 via a vehicle electronic control unit (ECU) 12 used in the vehicle. The vehicle ECU 12 includes an engine ECU configured to control an engine, a body ECU configured to control various actuators provided in the vehicle, or the like. The vehicular display device 100 includes a communication interface for communication with the vehicle ECU 12. The vehicular display device 100 acquires the signals output by the sensor group 11 from the vehicle ECU 12 through communication via the communication interface.

The notification action determination unit 142 determines actions of the image display unit 120 and the notification unit 130 in order to notify the driver of the vehicle state in accordance with the vehicle state acquired by the vehicle state acquisition unit 141. The notification action determination unit 142 has functions of an image notification determination unit 143 and a correspondence notification determination unit 144. By means of these functions, the notification action determination unit 142 determines an action synchronized with an image as one of actions for notification. The action synchronized with an image includes the output of audio or light by the notification unit 130 synchronized with the display of the image by the image display unit 120. For example, the action synchronized with an image may include the output of a voice message by the audio notification unit 131 synchronized with the display of an image of a message by the image display unit 120.

Vehicle states and actions for notification of the states have correspondence relation preliminarily set in the form of a relational expression, a table, or the like. The notification action determination unit 142 determines an action for notification by applying the vehicle state acquired by the vehicle state acquisition unit 141 to the preliminarily set relation between the vehicle states and the actions.

Examples of the correspondence relation between the vehicle states and the actions include vehicle speed and engine rotational speed that are each notified by an action of causing the image display unit 120 to display a character image indicating an acquired numerical value or an image of a meter. The examples also include a door open/close state that is notified by an action of turning ON a lamp corresponding to each door and included in the optical notification unit 132 if the door is open, or turning OFF the lamp if the door is closed.

The image notification determination unit 143 determines whether a vehicle state matches an image notification state. An image notification state relates to a vehicle state preliminarily determined to execute notification by an action synchronized with an image.

The action synchronized with the image includes simultaneous notification by the image display unit 120 and the notification unit 130. This action allows the driver to recognize the notified state more easily in comparison to notification by either one of the image display unit 120 and the notification unit 130. Accordingly, as the image notification state, the state promptly handled by being recognized by the driver through notification is preliminarily determined to be notified by the action synchronized with the image. Processing and an action for notification of an image notification state will be described below exemplifying a case where a state of traveling with any door being kept open is preliminarily set as the image notification state.

In this case, the image notification determination unit 143 determines the image notification state assuming that the vehicle is in the state of traveling with any door being kept open, when the image notification determination unit 143 determines that vehicle speed is equal to or more than a threshold for determination of traveling and any door is open in accordance with the vehicle state.

The correspondence notification determination unit 144 determines a correspondence notification action that corresponds to the image notification state. The correspondence notification action is to be executed by the notification unit 130 while the image display unit 120 displays an image indicating the image notification state. For example, the correspondence notification determination unit 144 determines, as the correspondence notification actions for the state of traveling with any door being kept open, actions of causing the audio notification unit 131 to output a voice message indicating that the door is open and blinking the lamp for the door determined as being opened.

When the image notification determination unit 143 determines that the image notification state is effected, the drawing request unit 145 requests the drawing device 200, via the connection unit 110, to draw an image for notification of the image notification state to the driver. Specifically, drawing request unit 145 requests drawing by causing the connection unit 110 to output a drawing request signal to request the drawing device 200 to draw an image. The drawing device 200 draws an image for notification of the image notification state to the driver in accordance with the request from the drawing request unit 145.

The vehicular display device 100 according to the present embodiment is configured to successively notify the driver, as an image, of a state such as vehicle speed or engine rotational speed if the engine is in operation regardless of whether the image notification state is effected. In a case where the image notification state is effected, the drawing request unit 145 accordingly requests to draw an image notifying the image notification state in addition to the state of the vehicle successively notified to the driver as an image. In another case where the image notification state is not effected, the drawing request unit 145 requests to draw the image notifying the state of the vehicle successively notified to the driver as an image.

The drawing request signal includes data indicating a numerical value of vehicle speed or engine rotational speed, and data indicating whether the image notification state is effected. In a case where the data indicating whether the image notification state is effected indicates that the image notification state is not effected, the drawing device 200 draws an image for notification of vehicle speed or engine rotational speed. In another case where the data indicating whether the image notification state is effected indicates that the image notification state is effected, the drawing device 200 draws an image for notification of the fact that the image notification state is effected, in addition to vehicle speed or engine rotational speed.

The correspondence identification unit 146 acquires the image as well as image identification information identifying the image notification state indicated by the image received from the drawing device 200. In accordance with the image identification information thus acquired, the correspondence identification unit 146 identifies a correspondence notification action for the image notification state indicated by the image displayed at the image display unit 120. The correspondence notification action is determined by the correspondence notification determination unit 144 as an action for the image notification state.

Image identification information is used to identify a correspondence notification action for an image notification state indicated by an image. The correspondence notification action thus identified is executed simultaneously with display of the corresponding image. The drawing device 200 accordingly transmits the image identification information to the vehicular display device 100 to clarify relation between the corresponding image and the image identification information. The drawing device 200 transmits the image identification information to the vehicular display device 100 such that the correspondence notification action for the image notification state indicated by the image can be identified before the image display unit 120 displays the image.

In a case where the vehicular display device 100 and the drawing device 200 are connected to each other via the transmission cable 300 according to a standard for transmission of an image and a separate control signal in different channels, the drawing device 200 starts transmission of image identification information at the time when the image is transmitted. In another case where the vehicular display device 100 and the drawing device 200 are connected to each other via the transmission cable 300 according to a standard for transmission of an image and a separate control signal in an identical channel, the drawing device 200 transmits image identification information immediately before start or immediately after end of transmission of the image.

Examples of the image identification information include a drawing request signal transmitted from the drawing request unit 145 to request drawing, and time of a drawing request made by the drawing request unit 145. In a case where image identification information relates to data transmitted to request drawing, the drawing device 200 returns a drawing request signal serving as image identification information along with an image drawn in accordance with the drawing request signal. The correspondence identification unit 146 acquires, as image identification information, the drawing request signal returned along with the drawn image. In a case where the acquired drawing request signal indicates that an image notification state is effected, the correspondence identification unit 146 determines a correspondence notification action for the image notification state.

In a case where image identification information relates to time of a request made, the drawing device 200 returns the time of reception of the drawing request signal along with an image drawn in accordance with the drawing request signal. The correspondence identification unit 146 acquires, as image identification information, time of reception of the drawing request signal returned from the drawing device 200. The correspondence identification unit 146 acquires, from the drawing request unit 145, time of the request made for drawing of an image indicating an image notification state. If the time acquired as image identification information matches the time of the request made for drawing of an image indicating an image notification state, the image acquired along with the image identification information indicates the image notification state. The correspondence identification unit 146 thus determines a correspondence notification action for the image notification state when the time matches.

The additional notification acquisition unit 147 acquires an additional notification action transmitted from the drawing device 200. The additional notification action is determined by the drawing device 200. An additional notification action is different from a correspondence notification action and executed by the notification unit 130. The drawing device 200 determines the additional notification action in accordance with a request from a different one of the vehicular display devices 100 such as the navigation device 100b. The additional notification action is executed in addition to notification by the different one of the vehicular display devices 100 and includes notification synchronized with image display by the vehicular display device 100. The additional notification action may alternatively be executed in place of notification by the different one of the vehicular display devices 100.

In a case where the navigation device 100b requests notification of necessity for turning right or left, the drawing device 200 determines an action of outputting a warning beep for alerting the driver from the audio notification unit 131 as the additional notification action. The drawing device 200 draws an image indicating necessity for turning right or left and transmits, to the vehicular display device 100, the additional notification action along with the drawn image. The additional notification acquisition unit 147 acquires the additional notification action transmitted along with the image from the drawing device 200.

Upon reception of the image from the drawing device 200, the image display unit 148 causes the image display unit 120 to display the received image until reception of a new image. The image display unit 148 thus executes notification by means of the image display unit 120.

The notification execution unit 149 causes the notification unit 130 to operate for execution of notification to the driver. Specifically, the notification execution unit 149 causes the notification unit 130 to execute an action of the notification unit 130 determined by the notification action determination unit 142 and not corresponding to a correspondence notification action. The notification execution unit 149 causes the notification unit 130 to execute a correspondence notification action identified by the correspondence identification unit 146. The notification execution unit 149 causes the notification unit 130 to execute the additional notification action acquired along with the image by the additional notification acquisition unit 147.

The notification execution unit 149 causes the notification unit 130 to execute the correspondence notification action not synchronized with image display in a synchronization impossible state. The synchronization impossible state relates to a state where execution of a correspondence notification action cannot be synchronized with display of an image indicating a corresponding image notification state. Specific examples of the synchronization impossible state include a state where an image cannot be displayed and a state where whether a displayed image indicates an image notification state cannot be determined. That is, an image and image identification information cannot be received in synchronization with each other from the drawing device 200 due to a communication error or stop of the drawing device 200.

Specifically, in a case where there is a correspondence notification action not executed by the notification unit 130 after elapse of predetermined standby time from determination by the correspondence notification determination unit 144, the notification execution unit 149 causes the notification unit 130 to execute the correspondence notification action.

The standby time serves as a time threshold for determination of a reason why a correspondence notification action has not yet been executed. The standby time enables determination of whether a reason why the correspondence notification action has not yet been executed relates to standby of processing such as drawing or a synchronization impossible state. The standby time may thus be determined by adding variation in time due to communication delay or the like to time estimated to elapse from determination of an image notification state by the image notification determination unit 143 to display by the image display unit 120.

The drawing device 200 includes a connection unit 210 and a control unit 220. The connection unit 210 is a terminal configured to connect the transmission cable 300. The connection unit 210 is electrically connected to the vehicular display device 100 via the transmission cable 300, and exchanges, with the vehicular display device 100, a drawn image and various control signals for a drawing request and the like. As described earlier, the vehicle includes a plurality of devices each corresponding to the vehicular display device 100. The drawing device 200 accordingly includes connection units 210 to be connected to the vehicular display devices 100.

The control unit 220 is mainly configured by a computer including a CPU, a graphics processing unit (GPU), a read only memory (ROM), a RAM, and the like. The CPU and the GPU execute a program stored in a non-transitory tangible storage medium while using a temporary storage function of the RAM. When the program is executed by the CPU and the GPU, the control unit 220 exhibits preliminarily set functions. Part or all of the functions exhibited by the control unit 220 may be embodied as hardware by a single or a plurality of ICs or the like. For example, a function of converting an image signal for exchange of an image via the transmission cable 300 may be embodied by an image signal conversion IC. The control unit 220 includes the GPU that may be replaced with a graphics display controller (GDC) or the like configured to draw an image. The drawing device 200 includes a communication interface for communication with the various vehicle ECUs 12. The control unit 220 exchanges a control signal or the like with the various vehicle ECUs 12 via the communication interface.

The control unit 220 exhibits functions as a drawing request reception unit 221, an additional information determination unit 222, a drawing unit 223, an image transmission unit 224, and an additional notification request unit 226. The ROM included in the control unit 220 stores image data for image drawing requested to the drawing device 200. The drawing request reception unit 221 acquires a drawing request signal transmitted from the vehicular display device 100 to the connection unit 210.

The additional information determination unit 222 determines additional drawing information and an additional notification action. The additional drawing information is drawn in an image drawn by the drawing device 200 in addition to a state indicated by the drawing request signal. The additional notification action is executed by the notification unit 130 while the additional drawing information is notified by the image display unit 120.

For example, upon reception of a signal indicating determination of necessity for turning right or left from the navigation device 100b, additional information determination unit 222 determines drawing an image indicating turning right or left as additional drawing information. In this case, the additional information determination unit 222 further determines output of a warning beep as an additional notification action.

Figure 3:
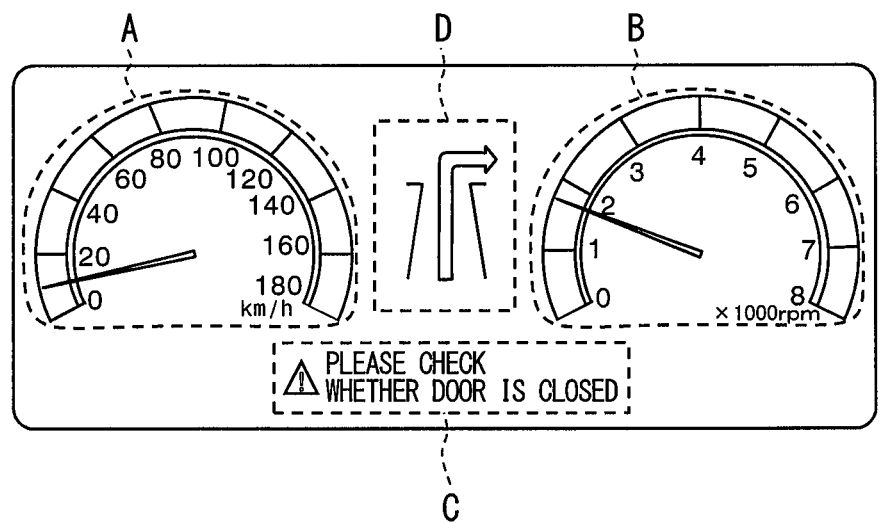
FIG. 3 is a diagram showing an exemplary view of an image drawn by the drawing device.

The drawing unit 223 synthesizes images stored in the ROM in the control unit 220 to draw an image requested by the vehicular display device 100 in accordance with a drawing request signal. The image drawn by the drawing unit 223 will be described exemplifying the image shown in FIG. 3. FIG. 3 exemplifies an image drawn by the drawing unit 223 in an image notification state.

The drawing unit 223 draws an image depicting a speedometer in a range A in order to indicate vehicle speed. The image depicting the speedometer is drawn through synthesizing an image depicting an indicator panel of a speedometer and an image depicting a pointer, which are stored in the ROM, such that the pointer is positioned in accordance with a numerical value of the vehicle speed on the indicator panel. The drawing unit 223 further draws, in a range B, an image depicting a tachometer similarly to the speedometer, in order to indicate engine rotational speed.

The drawing unit 223 draws, in a range C, an image of a message indicating that an image notification state is effected, in order to indicate that the image notification state is effected. The message indicating that the image notification state is effected is drawn through synthesizing images of letters stored in the ROM so as to be disposed to form a readable message indicating that the image notification state is effected.

The drawing unit 223 draws, in a range D, an image according to additional drawing information determined by the additional information determination unit 222. The drawing unit 223 draws, in the range D, an image indicating an action of turning right or left at an intersection, in accordance with the additional drawing information.

The drawing unit 223 draws contents varied in accordance with contents indicated by a drawing request signal and availability of additional drawing information. In an exemplary case where the drawing request signal indicates that no image notification state is effected and additional drawing information is not determined, the drawing unit 223 draws images depicting a speedometer and a tachometer in the ranges A and B indicated in FIG. 3. The drawing unit 223 does not draw any message or the like in the range C or D in this case.

The ranges depicting a meter, a message, or the like may be changed from the ranges indicated in FIG. 3 in accordance with change of contents drawn by the drawing unit 223. In an exemplary case where no image notification state is effected and the additional information determination unit 222 does not determine additional drawing information, the ranges A and B for the speedometer and the tachometer drawn by the drawing unit 223 may be extended from the ranges indicated in FIG. 3.

Description is made with reference to FIG. 2 again. The image transmission unit 224 causes the connection unit 210 to transmit the image drawn by the drawing unit 223 to the vehicular display device 100. The identification information transmission unit 225 causes the connection unit 210 to transmit, to the vehicular display device 100, the image transmitted by the image transmission unit 224 as well as image identification information identifying an image identification state indicated by the image.

The additional notification request unit 226 causes the connection unit 210 to transmit, to the vehicular display device 100, an image drawn in accordance with additional drawing information as well as an additional action corresponding to the additional drawing information.

Operations of Vehicular Display Device 100

Figure 4:
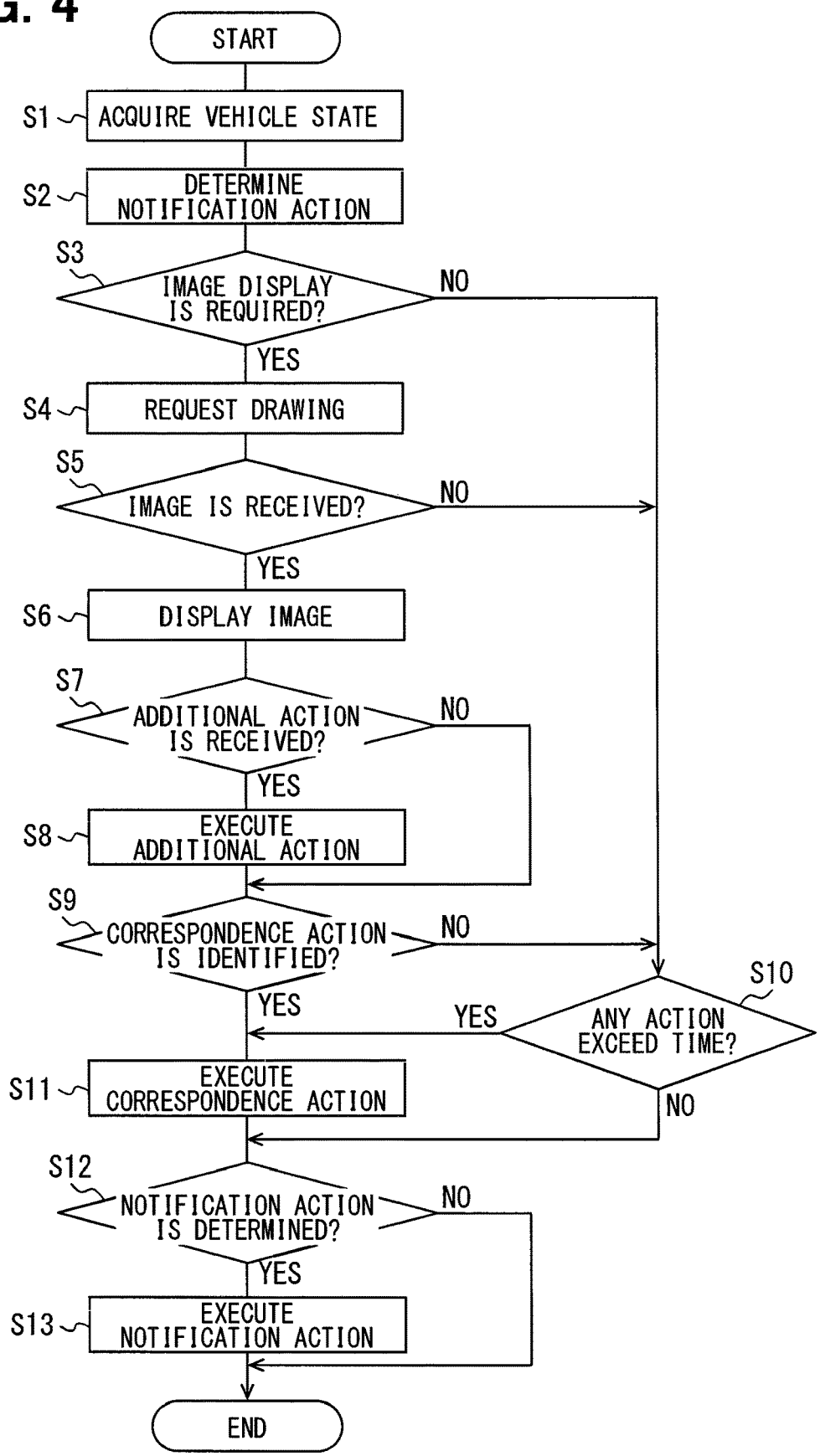
FIG. 4 is a flowchart showing operations of the vehicular display device.

Operations of the vehicular display device 100 will be described with reference to the flowchart in FIG. 4. The vehicular display device 100 periodically executes processing from S1 shown in FIG. 4.

S1 includes acquiring a vehicle state. S1 corresponds to processing executed by the vehicle state acquisition unit 141. S2 includes determining actions of the image display unit 120 and the notification unit 130 for notification of the vehicle state acquired in S1 to the driver. S2 corresponds to processing executed by the notification action determination unit 142.

S3 includes determining whether notification by an action of displaying an image at the image display unit 120 is determined in S2. The process flow proceeds to S4 if execution of display is determined, whereas the process flow proceeds to S10 if no execution of display is determined.

S4 includes requesting the drawing device 200 to draw an image indicating a vehicle state to be notified by image display as determined in S2. S4 corresponds to processing executed by the drawing request unit 145.

S5 includes determining whether having received an image drawn by the drawing device 200. The process flow proceeds to S6 if the image is received, whereas the process flow proceeds to S10 if the image is not received. S6 includes updating the image displayed at the image display unit 120 with the image received in S5. S5 and S6 correspond to processing executed by the image display unit 120.

S7 includes determining whether having received an additional notification action from the drawing device 200.

The process flow proceeds to S8 if the additional notification action is received, whereas the process flow proceeds to S9 if the additional notification action is not received. S7 corresponds to processing executed by the additional notification acquisition unit 147.

S8 includes causing the notification unit 130 to execute the additional notification action received in S7. The audio notification unit 131 operates if the additional notification action thus received relates to notification by means of audio, or the optical notification unit 132 operates if the additional notification action thus received relates to notification by means of light. The audio notification unit 131 and the optical notification unit 132 operate in synchronization with each other if the additional notification action thus received relates to notification by means of audio and light synchronized with each other. S8 corresponds to processing executed by the notification execution unit 149.

S9 includes determining whether a correspondence notification action for the image notification state indicated by the image displayed in S6 is identified in accordance with image identification information received from the drawing device 200. The process flow proceeds to S11 if any correspondence notification action is identified, whereas the process flow proceeds to S10 if no correspondence notification action is identified. S9 corresponds to processing executed by the correspondence identification unit 146.

S10 includes determining whether the correspondence notification action determined in preceding S2 includes any action not yet executed despite the fact that the predetermined standby time has elapsed after the determination. The process flow proceeds to S11 if there is any action not yet executed, whereas the process flow proceeds to S12 if there is no action not yet executed.

S11 includes causing the notification unit 130 to execute the correspondence notification action identified in latest S9 or the correspondence notification action determined in S10 as not being executed despite the fact that the standby time has already elapsed. The audio notification unit 131 operates if the correspondence notification action relates to notification by means of audio, or the optical notification unit 132 operates if the correspondence notification action relates to notification by means of light. The audio notification unit 131 and the optical notification unit 132 operate in synchronization with each other if the correspondence notification action relates to notification by means of audio and light synchronized with each other. S11 corresponds to processing executed by the notification execution unit 149.

S12 includes determining whether any action of the notification unit 130 other than a correspondence notification action is determined in latest S2. The process flow proceeds to S13 if any action is determined, whereas the process flow shown in FIG. 4 ends if no action is determined. S13 includes causing the notification unit 130 to execute the action other than a correspondence notification action determined in S2. The audio notification unit 131 operates if the action other than a correspondence notification action relates to notification by means of audio, or the optical notification unit 132 operates if the action relates to notification by means of light. The audio notification unit 131 and the optical notification unit 132 operate in synchronization with each other if the action other than a correspondence notification action relates to notification by means of audio and light synchronized with each other. S13 corresponds to processing executed by the notification execution unit 149.

Operations of Drawing Device 200

Operations of the drawing device 200 will be described with reference to the flowchart in FIG. 5. The drawing device 200 periodically executes processing from S21 shown in FIG. 5.

S21 includes determining whether having received a drawing request signal from the vehicular display device 100. The process flow proceeds to S22 if the drawing request signal is received, whereas the process flow shown in FIG. 5 ends if no drawing request signal is received, S21 corresponds to processing executed by the drawing request reception unit 221. S22 includes determining whether additional drawing information is determined. S22 corresponds to processing executed by the additional information determination unit 222.

S23 includes drawing an image to be displayed by the vehicular display device 100 having transmitted a drawing request signal, in accordance with the drawing request signal received in S21 and the additional drawing information determined in S22. S24 includes drawing an image to be displayed by the vehicular display device 100 having transmitted the drawing request signal, in accordance with the drawing request signal received in S21. S23 and S24 correspond to processing executed by the drawing unit 223.

Figure 5:
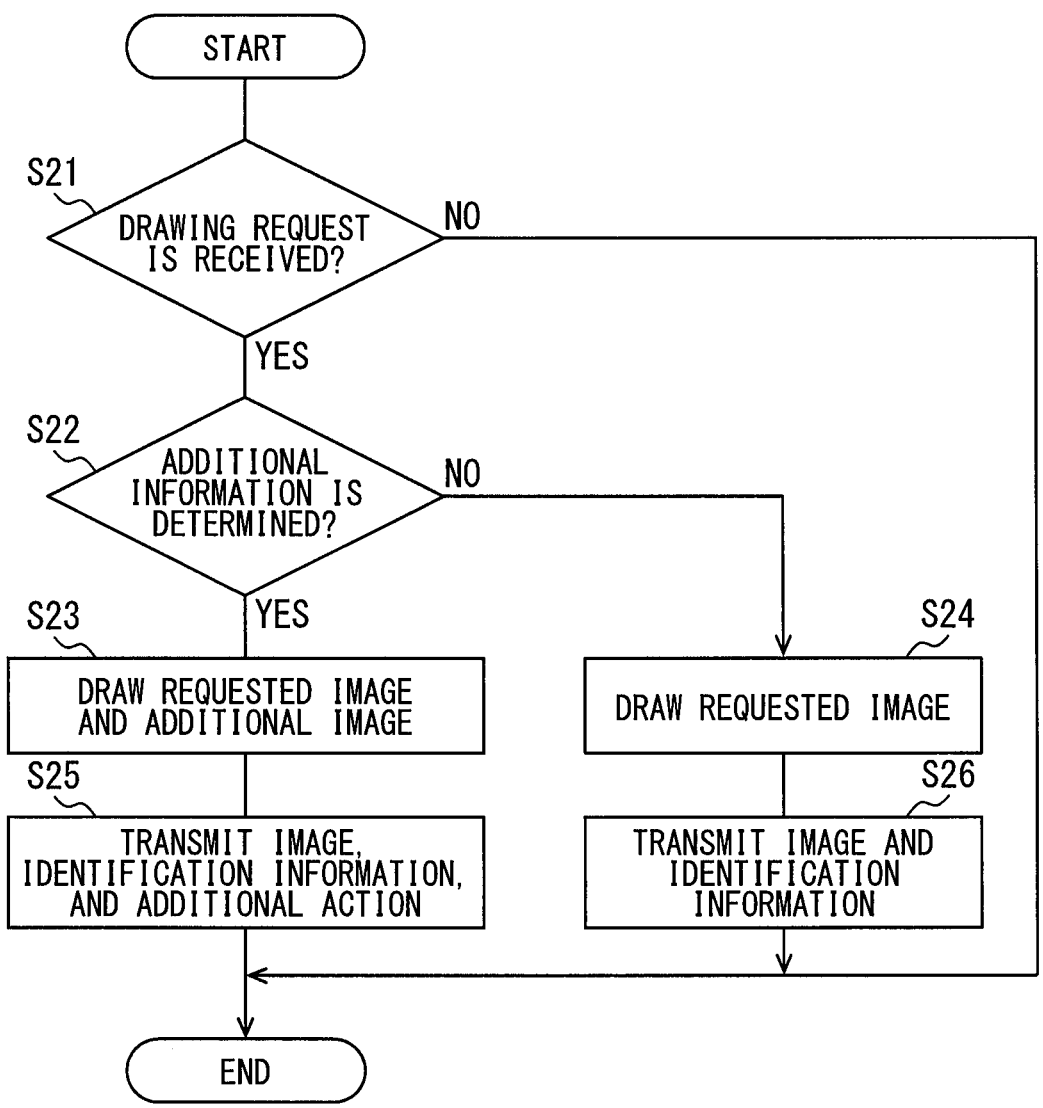
FIG. 5 is a flowchart showing operations of the drawing device.

S25 includes transmitting, to the vehicular display device 100, the image drawn in S23, the drawing request signal received in S21 as image identification information, and an additional notification action additionally executed by the notification unit 130 included in the vehicular display device 100, and ends the processing shown in FIG. 5. S25 corresponds to processing executed by the image transmission unit 224, the identification information transmission unit 225, and the additional notification request unit 226.

S26 includes transmitting, to the vehicular display device 100, the image drawn in S24 and the drawing request signal received in S21 as image identification information, and ends the processing shown in FIG. 5. S26 corresponds to processing executed by the image transmission unit 224 and the identification information transmission unit 225.

Summary of Embodiment

According to the embodiment described above, the image display unit 120 displays the image corresponding to the image notification state and drawn by the drawing device 200 in accordance with the request from the drawing request unit 145. In this case, the correspondence identification unit 146 acquires the image as well as correspondence identification information identifying the image notification state indicated by the image received from the drawing device 200. In accordance with the correspondence identification information, the correspondence identification unit 146 can identify the correspondence notification action for the image notification state indicated by the image displayed at the image display unit 120.

Even in a case where there is variation in time from a drawing request by the drawing request unit 145 to image display by the image display unit 120, the correspondence notification action can be executed accompanied with display of the image indicating the image notification state. In other words, this configuration can inhibit difference in time between display at the image display unit 120 of the image provided from the drawing device 200 and the different notification by the notification unit 130.

In a case where there is a correspondence notification action not executed by the notification unit 130 after elapse of predetermined standby time from determination by the correspondence notification determination unit 144, the notification execution unit 149 causes the notification unit 130 to execute the correspondence notification action. The notification execution unit 149 accordingly executes the correspondence notification action in asynchronization with image display in a case where an image indicating the image notification state cannot be displayed or in a case where whether the image indicates any image notification state cannot be determined. This configuration can inhibit failing to execute notification indicating that an image notification state is effected.

The additional notification acquisition unit 147 acquires the additional notification action transmitted along with the image from the drawing device 200. The notification execution unit 149 causes the notification unit 130 to execute the additional notification action acquired by the additional notification acquisition unit 147. This enables execution of notification in synchronization with image display by the vehicular display device 100 in addition to notification at a different one of the vehicular display devices 100. Alternatively, this enables execution of notification in synchronization with image display by the vehicular display device 100 instead of notification at a different one of the vehicular display devices 100.

Any element mentioned in the following description and denoted by the reference sign referred to earlier is identical with the element denoted by the identical reference sign in the preceding embodiment, unless otherwise specified. In a case where only part of any configuration is described, the preceding embodiment is applicable to the remaining part of the configuration.

First Modification

The above embodiment sets, as an image notification state determined by the image notification determination unit 143, only a state of traveling with any door being kept open. The image notification state may alternatively include a plurality of states. The image notification state may still alternatively include a plurality of states that may occur simultaneously.

The image notification state may exemplarily be set to include a state of traveling with any door being kept open and a state of traveling with a seat belt not being fastened. In this case, the drawing request unit 145 transmits a drawing request signal including data indicating whether each of the two image notification states is effected.

In a case where the drawing request signal indicates that one of the image notification states is effected, the drawing unit 223 draws a message indicating that the image notification state is effected. In another case where the drawing request signal indicates that both of the image notification states are effected, the drawing unit 223 simultaneously draws messages indicating that the image notification states are effected.

In a case where image identification information indicates that one of the image notification states is effected, the correspondence identification unit 146 identifies a correspondence notification action for the image notification state as a correspondence notification action for the image notification state indicated by the image. The notification execution unit 149 causes the notification unit 130 to execute the correspondence notification action in this case.

In another case where the image identification information indicates that both of the image notification states are effected, the correspondence identification unit 146 simultaneously identifies correspondence notification actions for the image notification states as correspondence notification actions for the image notification states indicated by the image.

If it is impossible to cause the notification unit 130 to simultaneously execute correspondence notification actions identified simultaneously, the notification execution unit 149 may cause the notification unit 130 to execute the correspondence notification actions in a preferential order preliminarily determined.

In an exemplary case where actions of causing the audio notification unit 131 to output different voice messages are identified as correspondence notification actions, the notification execution unit 149 may cause the audio notification unit 131 to output a first one of the voice messages in accordance with the preliminarily determined preferential order, and subsequently cause the audio notification unit 131 to output a second one of the voice messages.

The notification execution unit 149 may alternatively execute notification by execution of another preliminarily determined action instead of correspondence notification action. In an exemplary case where actions of causing the audio notification unit 131 to output different voice messages are identified as correspondence notification actions, the notification execution unit 149 may cause the audio notification unit 131 to output a preliminarily determined warning beep instead of outputting the voice messages.

Second Modification

The above embodiment includes displaying vehicle speed and engine rotational speed as images at the image display unit 120, in addition to an image notification state. The present disclosure is, however, not limited to these contents displayed as images.

For example, only the image notification state may be indicated as an image. Alternatively, the image notification state, vehicle speed, engine rotational speed, as well as an additional vehicle state such as a position of a shift lever, may be displayed as images.

The flowcharts or the processing shown in the flowcharts according to the present disclosure include a plurality of sections (alternatively referred to as steps) each indicated as S1 or the like. Some of the sections may be further divided into a plurality of subsections or may be appropriately combined to configure a single section. Each of these sections may also be referred to as a circuit, a device, a module, or means. Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device. The hardware section may still alternatively be installed in a microcomputer.

The present disclosure has been described with reference to working examples, but the present disclosure should not be limited to these working examples or the configurations. The present disclosure can include various modification examples as well as modifications made within equivalent ranges. Furthermore, various combinations and modes, as well as other combinations and modes each obtained by adding only one or more elements to or removing any element from a corresponding one of the various combinations and modes will fall within the scope and the ideological scope of the present disclosure.

What is claimed is:

1. A vehicular display device used in a vehicle and configured to display an image received from a drawing device, the vehicular display device comprising:
an image display unit configured to execute notification by displaying the image drawn by the drawing device;
a notification unit configured to execute notification by at least one of audio and light;
an image notification determination unit configured to determine whether the vehicle is in an image notification state, the image display unit and the notification unit executing the notification of a vehicle state by synchronizing with each other in the image notification state;
a drawing request unit configured to request the drawing device to draw the image corresponding to the image notification state when the image notification determination unit determines that the vehicle is in the image notification state;
a correspondence notification determination unit configured to determine a correspondence notification action corresponding to the image notification state as an action executed by the notification unit accompanied with the notification of the image notification state by the image display unit when the image notification determination unit determines that the vehicle is in the image notification state;
a correspondence identification unit configured to acquire, along with the image, image identification information identifying the image notification state indicated by the image received from the drawing device, and identify, in accordance with the image identification information, the correspondence notification action corresponding to the image notification state indicated by the image displayed at the image display unit; and
a notification execution unit configured to cause the notification unit to execute the correspondence notification action identified by the correspondence identification unit.

2. The vehicular display device according to claim 1, wherein
the notification execution unit causes the notification unit to execute the correspondence notification action when predetermined standby time elapses from time when the correspondence notification determination unit determines the correspondence notification action corresponding to the image notification state and the notification unit does not execute the correspondence notification action.

3. The vehicular display device according to claim 1, further comprising
an additional notification acquisition unit configured to acquire an additional notification action other than the correspondence notification action, as an action determined by the drawing device and received along with the image from the drawing device to be executed by the notification unit accompanied with display of the image at the image display unit, wherein
the notification execution unit causes the notification unit to execute the additional notification action.

4. The vehicular display device according to claim 1, wherein the correspondence notification action is performed by the notification unit by synchronizing with the image display unit displaying the image indicating the image notification state.

5. The vehicular display device according to claim 1, wherein the image display unit and the notification unit simultaneously execute the notification of the vehicle state in the image notification state.

6. A vehicular display device used in a vehicle and configured to display an image received from a drawing device, the vehicular display device comprising:
an image display unit configured to execute notification by displaying the image drawn by the drawing device;
a notification unit configured to execute notification by at least one of audio and light; and
a processor configured to:
determine whether the vehicle is in an image notification state, the image display unit and the notification unit executing the notification of a vehicle state by synchronizing with each other in the image notification state;
request the drawing device to draw the image corresponding to the image notification state when the processor determines that the vehicle is in the image notification state;
determine a correspondence notification action corresponding to the image notification state as an action executed by the notification unit accompanied with the notification of the image notification state by the image display unit when the processor determines that the vehicle is in the image notification state;
acquire, along with the image, image identification information identifying the image notification state indicated by the image received from the drawing device, and identify, in accordance with the image identification information, the correspondence notification action corresponding to the image notification state indicated by the image displayed at the image display unit; and
cause the notification unit to execute the identified correspondence notification action.

7. A vehicular display device used in a vehicle and configured to display an image received from a drawing device, the vehicular display device comprising:
an image display unit configured to execute notification by displaying the image drawn by the drawing device;
a notification unit configured to execute notification by at least one of audio and light; and
a processor configured to:
determine whether the vehicle is in an image notification state, the image display unit and the notification unit executing the notification of a vehicle state by synchronizing with each other in the image notification state;
request the drawing device to draw the image corresponding to the image notification state when the processor determines that the vehicle is in the image notification state;
acquire, along with the image, image identification information identifying the image notification state indicated by the image received from the drawing device, and identify, in accordance with the image identification information, a correspondence notification action corresponding to the image notification state indicated by the image displayed at the image display unit; and
cause the notification unit to execute the identified correspondence notification action.

8. The vehicular display device according to claim 7, wherein
the processor further configured to:
determine the correspondence notification action corresponding to the image notification state as an action executed by the notification unit accompanied with the notification of the image notification state by the image display unit when the processor determines that the vehicle is in the image notification state; and cause the notification unit to execute the correspondence notification action when predetermined standby time elapses from time when the processor determines the correspondence notification action corresponding to the image notification state and the notification unit does not execute the correspondence notification action.

* * * * *